July 29, 1958   E. HAUGHTON   2,845,300
LOAD CARRYING TIPPING VEHICLES
Filed Sept. 21, 1954   5 Sheets-Sheet 1
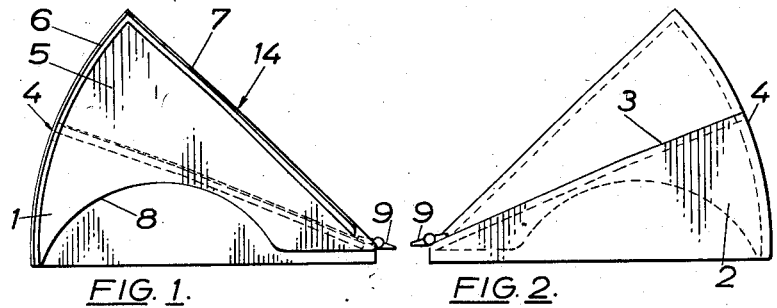
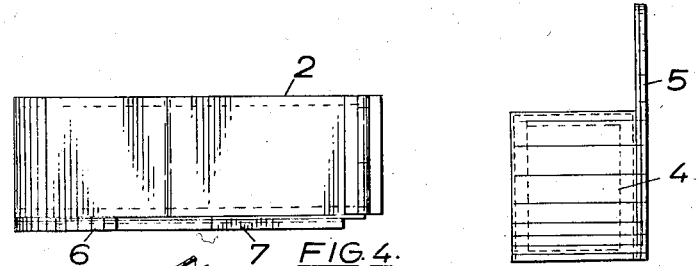
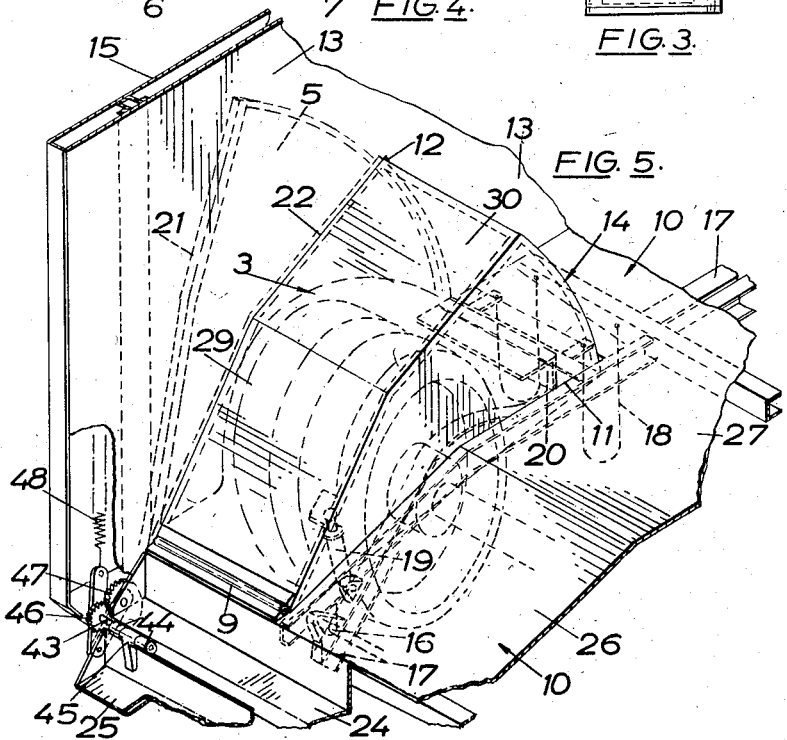
Inventor,
ERNEST HAUGHTON
By
Mead, Browne, Schuyler & Beveridge
Attorneys July 29, 1958     E. HAUGHTON     2,845,300
LOAD CARRYING TIPPING VEHICLES
Filed Sept. 21, 1954     5 Sheets-Sheet 2
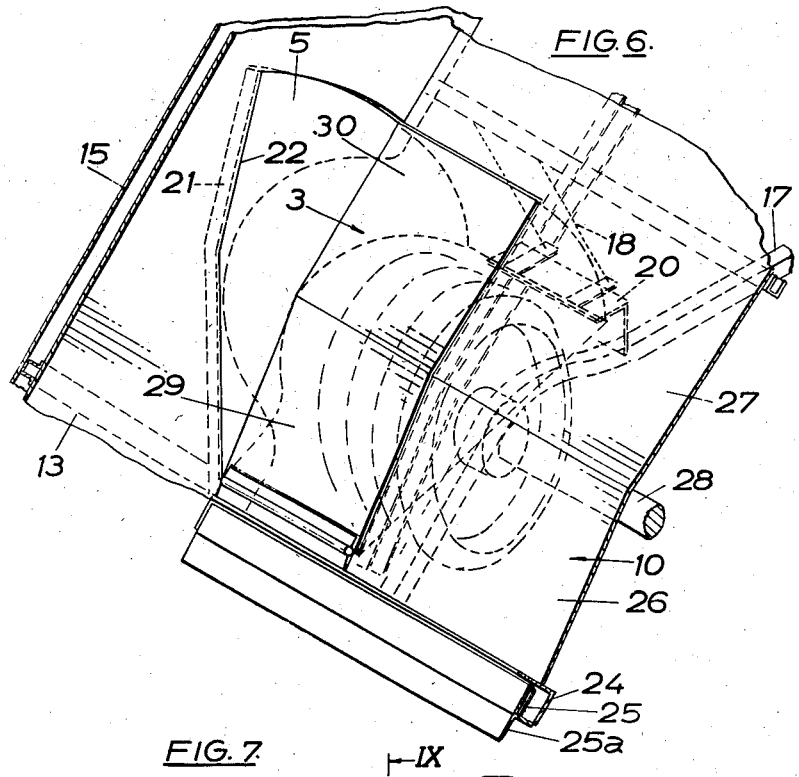
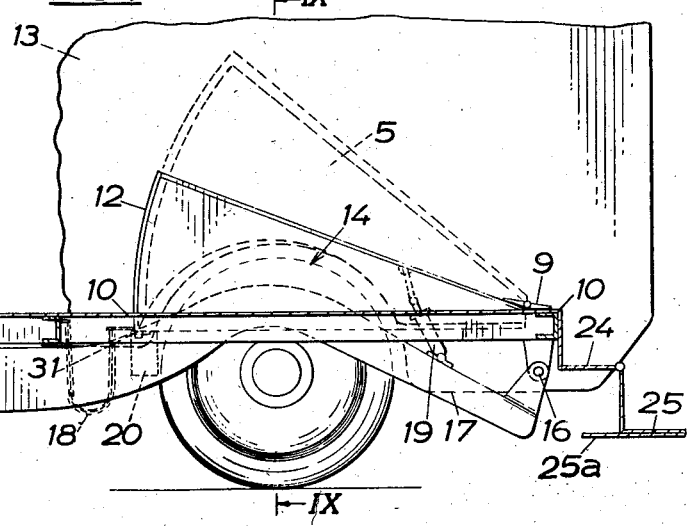
Inventor,
ERNEST HAUGHTON July 29, 1958 E. HAUGHTON 2,845,300
LOAD CARRYING TIPPING VEHICLES
Filed Sept. 21, 1954 5 Sheets-Sheet 3
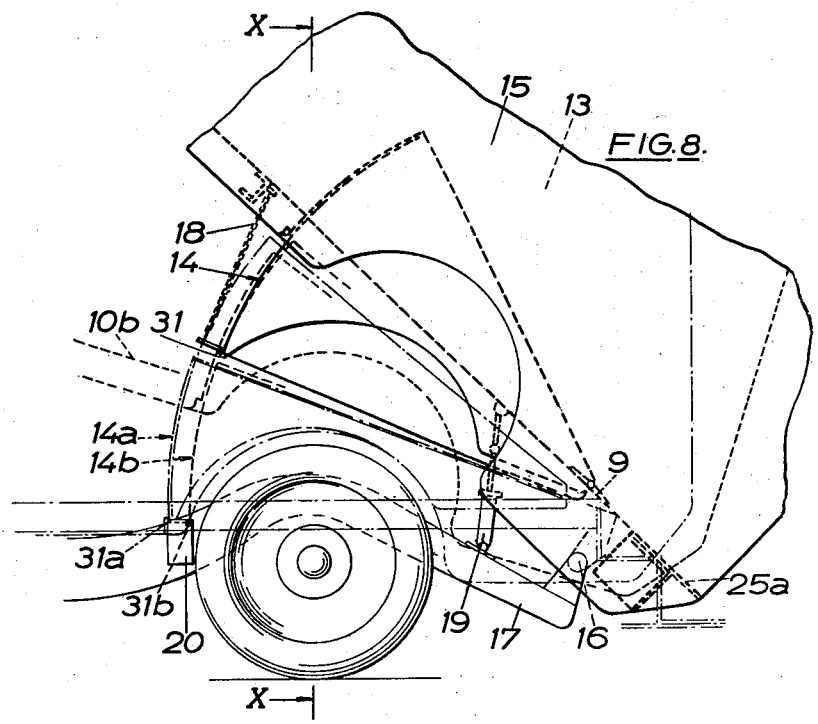
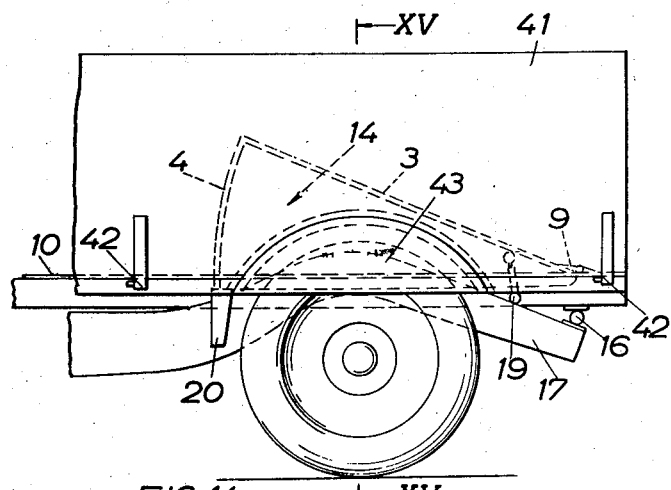
Inventor,
ERNEST HAUGHTON
By
Mead, Browne, Schaefer & Beveridge
Attorneys

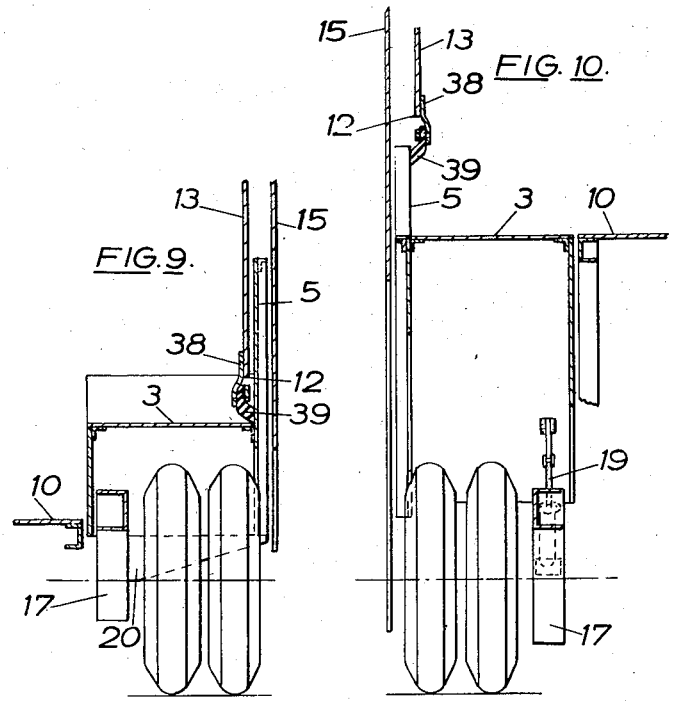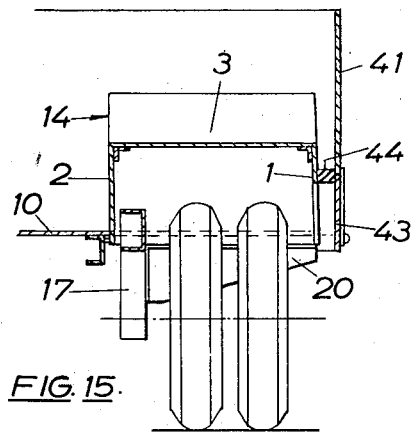

July 29, 1958 E. HAUGHTON 2,845,300
LOAD CARRYING TIPPING VEHICLES
Filed Sept. 21, 1954 5 Sheets-Sheet 5
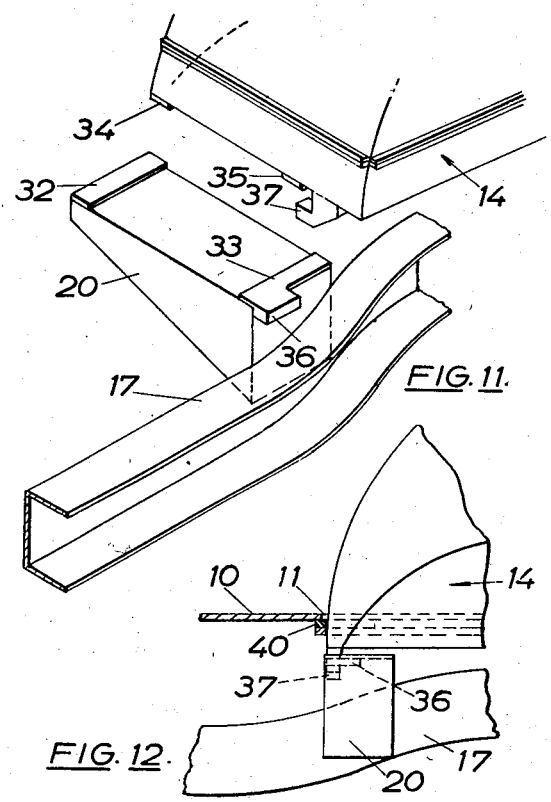
FIG. 11.
FIG. 12.
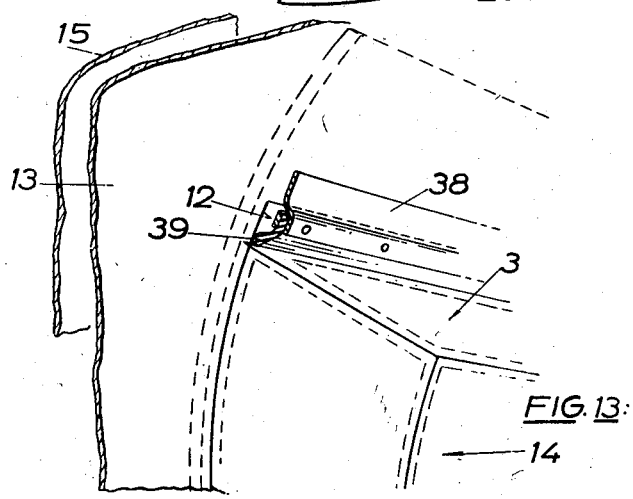
FIG. 13.
Inventor
ERNEST HAUGHTON,
By
Mead Browne, Schuyler & Beveridge
Attorneys United States Patent Office 2,845,300
Patented July 29, 1958

2,845,300
LOAD CARRYING TIPPING VEHICLES

Ernest Haughton, Scarth Hill, Ormskirk, England, assignor to The Lord Mayor, Aldermen and Citizens of Liverpool, England Application September 21, 1954, Serial No. 457,509
Claims priority, application Great Britain October 1, 1953

11 Claims. (Cl. 298—17)

The present invention relates to load carrying tipping vehicles and vehicle bodies.

It is desirable that the platform of a load carrying tipping vehicle should be reasonably low so as to minimise the manual labour of loading the vehicle and to achieve a reasonably low centre of gravity of the vehicle when loaded. With wheels of normal size this could be done by fitting wheel arches which project into the vehicle but wheel arches tend to obstruct the discharge of the load on tipping and this is especially inconvenient when the vehicle is used for disposal of refuse. To avoid this difficulty relatively small wheels are sometimes used but the extent to which the level of the platform can be lowered by the use of small wheels is limited and small wheels tend to limit the mobility of the vehicle in that it cannot satisfactorily be used on rough or soft ground. Moreover small wheels impose a limit upon the size of the brake drums and thus tend to limit the brake power of the vehicle.

The object of the present invention is to provide a vehicle with a body having a low platform without necessitating the use of small wheels and without detriment to the satisfactory discharge of the contents of the vehicle on tipping of the body.

The present invention provides a load carrying tipping vehicle having a rearwardly tipping body the floor of which has openings in the region of the rear wheels through which the wheels can project when the body is in its normal position and having wheel arches rearwardly hinged to the body floor and fitting in and closing said openings and relatively to which the body is angularly displaceable on tipping to result in downward retraction of the wheel arches from the body on tipping, each of said wheel arches having a rearward crown portion which when the body is in its normal position inclines upwardly and forwardly relatively to the floor and meets a forward arcuate crown portion which extends downwardly and forwardly close to the forward margin of its opening in the floor, said rearward crown portion lying close to the floor when the body is tipped with the arcuate crown portion remaining close to the forward margin of its opening in the floor, whereby to reduce the obstruction of the wheel arch to the discharge of the contents of the vehicle.

The invention will be further described by way of example with reference to the accompanying drawings in which:

Fig. 1 is an outer side view of one form of wheel arch according to the present invention, Fig. 2 is an inner side view corresponding to Fig. 1, Fig. 3 is an end view corresponding to Fig. 1, Fig. 4 is a plan view corresponding to Fig. 1, Fig. 5 is a fragmentary perspective view of part of the rear part of a vehicle embodying the present invention and with the body horizontal, Fig. 6 is a view similar to Fig. 5 but with the body tipped through approximately 45°.

Fig. 7 is a part sectional fragmentary side view of the rear part of another vehicle embodying the present invention being a modification of the embodiments shown in Figs. 5 and 6 and with the vehicle body horizontal, Fig. 8 is a view corresponding to Fig. 7 showing the body tipped through approximately 45° and also in an intermediate position.

Fig. 9 is a fragmentary end sectional view along the line 9—9 of Fig. 7,

Fig. 10 is a fragmentary end sectional view along the line 10—10 of Fig. 8,

Fig. 11 is a detail perspective view of an outrigger and wheel arch lock,

Fig. 12 is a fragmentary outer side view corresponding to Fig. 11,

Fig. 13 is a detail perspective view of a scraper,

Fig. 14 is a fragmentary outer side view of the rear part of a drop side tipping vehicle embodying the present invention, and Fig. 15 is a fragmentary end sectional view along the line 15—15 of Fig. 14.

Figs. 1, 2, 3 and 4 illustrate one form of wheel arch suitable for use in conjunction with the present invention and which consists of suitable framing with an outer side plate 1, an inner side plate 2, a substantially flat crown portion 3 which at its rearward end meets the upper end of an arcuate crown portion 4. The outer side plate 1 continues upwardly to form a valance 5 which is roughly of sectoral shape. The outer side plate 1 and valance 5 are stiffened by outwardly directed angles 6, 7 running along the edges thereof. The outer side plate 1 and the valance 5 are for the sake of convenience referred to as separate elements although they are preferably formed of a single sheet of material. The outer side plate 1 is cut away as at 8 to give it an arcuate lower profile for convenience in removing and assembling wheels and tyres.

The invention includes a wheel arch for load carrying tipping vehicles having a substantially flat crown portion and an arcuate crown portion and preferably having a valance extending upwardly from one of its sides.

The wheel arch is thus of approximately sectoral form in side elevation. Such a wheel arch can be permanently fixed to the chassis of the vehicle, the platform of which is provided with a rectangular opening at each side thereof to receive the wheel arch. If the body is pivoted to the chassis in the region where the flat crown portion 3 intersects the plane of the platform it will be appreciated that as the platform is tilted relatively to the chassis the wheel arch will be displaced relatively to the platform and that after the platform has been tipped through a predetermined angle the flat crown portion will be substantially coplanar with the platform. Whilst this predetermined angle may be sufficient for a particularly free flowing pay load it may not always be sufficient and rather than increase the sectoral angle of the wheel arch to increase the predetermined angle it is preferable in many cases to pivot the rear or pointed end of the wheel arch with a hinge 9 as shown in Figs. 1 and 2 thereby avoiding an undesirable restriction of pay load capacity of the vehicle body which would result from an increased sectoral angle of the wheel arch.

The wheel arch is pivotally mounted on the platform of the vehicle as illustrated in Fig. 5 so that after the platform has been tipped through a predetermined angle corresponding to the sectoral angle of the wheel arch, the wheel arch can be angularly displaced with further tipping of the platform with the flat crown portion of the wheel arch remaining substantially co-planar with the platform of the vehicle.

Referring now to Figs. 5, 6, 7 and 8, the platform 10 of the vehicle shown in perspective view in Fig. 5 has a rectangular opening 11 at each side thereof at or near the rear of the platform and above the position of the axle. A sectoral opening 12 is formed in each side wall 13 of the body. The sectoral openings 12 extend upwardly in the inner side walls 13 from the openings 11 in the platform 10. Each opening 11 is closed by a wheel arch 14 constructed as shown in Figs. 1 to 4 with the hinges 9 secured to the rear of the platform 10.

The position of the valance 5 is indicated in Fig. 5 by dotted lines. The valance 5 and outer side plate 1 are enclosed by the inner side wall 13, and the outer side wall 15 (Figs. 5, 6) on each side of the vehicle.

The vehicle body is hinged at 16 (Figs. 7 and 8) to the chassis 17. A flexible connection 18 (Figs. 7 and 8) is provided between the vehicle body and the forward end of the wheel arch 14 to enable the body to raise the wheel arch during part of its upward tipping movement. A pivoted lever connection may be provided between the chassis 17 and the wheel arch to limit the extent to which the wheel arch can rise during the upward tipping movement of the body, but it is preferred to employ a piston and cylinder or dash pot mechanism 19.

With the vehicle body and wheel arch in the positions shown in Figs. 5 and 7 the inclination of the flat crown portion 3 of the wheel arch is about half the total inclination of the platform 10 when angularly displaced to its fully tipped position as shown in Figs. 6 and 8. Thus to bring the crown portion 3 of the wheel arch flush with the platform 10 when fully tipped it is only necessary for the wheel arch to move through about half the angular displacement of the platform. The connection 10 is positioned and dimensioned so as to prevent further upward angular displacement of the wheel arch when it has been elevated through about half the angular displacement of the vehicle body whilst the length of the flexible connection 18 is such as to cause the wheel arch to begin to rise at latest when the body has been angularly displaced upwardly through about half of its maximum angular displacement.

The substantially flat crown portion 3 of the wheel arch preferably conforms with the shape of the platform. Thus if the platform is substantially planar as illustrated in Figs. 7 and 8 the flat crown portion may similarly be substantially planar. In many cases it is found advantageous for the rear portion of the platform to be inclined slightly downwardly rearwardly particularly in the case of vehicles intended for refuse collection. The platform illustrated in Figs. 5 and 6 has a rear portion 26 which is inclined downwardly rearwardly relatively to a major front portion 27, the two portions merging into one another approximately over the rear axle 28 when the vehicle body is substantially horizontal and the flat crown portion of the wheel arch is in a similar manner formed of a rear planar portion 29 inclined to a front portion 30 such that when the vehicle body has been tipped to approximately half the angular displacement of the platform the rear portion 29 of the wheel arch is substantially flush with the rear portion 26 of the platform and the front portion 30 of the flat portion of the wheel arch is substantially flush with the main or front portion 27 of the platform as illustrated in Fig. 6.

When the wheel arch 14 is in its lowermost position its forward end rests on an outrigger 20 which is fixed to the chassis 17. This outrigger 20 is illustrated in greater detail in Figs. 11 and 12.

As will be more clearly seen from Figs. 7 and 8 the axis of the hinge 9 joining the wheel arch 14 and the platform 10 is displaced from the axis about which the body is hinged at 16 to the chassis 17 so that initial tilting of the vehicle body relatively to the chassis causes the front end 31 of the wheel arch to move rearwardly relatively to the chassis and slide over the top of the outrigger 20. The position of the wheel arch 14 and its front end 31 relatively to the outrigger 20 and the chassis 17 may be seen most clearly from Fig. 7. This position is also shown diagrammatically in dot and dash lines in Fig. 8, the wheel arch being indicated at 14a and the front end at 31a. When the vehicle body has been tipped through about half the normal angular displacement to bring the platform into the position 10b as indicated by the broken lines in Fig. 8, the wheel arch will have moved rearwardly relatively to the chassis into the position indicated by the broken lines 14b bringing its front edge into the position indicated at 31b and it will be seen that the front edge 31 has been caused to slide backwardly over the surface of the outrigger 20. Such movement of the front edge of the wheel arch during the tipping or lowering of the vehicle body may be used to provide a retaining lock for the wheel arch.

Referring more particularly to Figs. 11 and 12 the upper surface of the outrigger 20 carries two bearing surfaces 32, 33 to receive complementary bearing surfaces 34, 35 carried by the under surface of the wheel arch. The bearing surface 33 has an inwardly projecting lug-shaped latch element 36 at its front for engagement with a hook shaped latch element 37 projecting downwardly below the front end of the wheel arch 14. When the vehicle body is fully lowered the latch element 37 is engaged by the latch element 36 and during approximately half the full angular rotation of the body relatively to the chassis during tipping the latch element 37 is moved rearwardly out of meshing engagement with the latch element 36 to permit subsequent rotation of the wheel arch with continued angular displacement of the body.

The sectorally shaped valance 5 is provided to ensure that the contents of the vehicle do not escape through the opening 12 in the side of the body when the body has been tipped and the wheel arch withdrawn to bring its crown portion 3 flush with the platform 10 and it will be noted from Figs. 6 and 10 that when the body is fully tipped and the wheel arch fully withdrawn the upper edge 21 of the valance 5 lies just above the inclined upper edge 22 of the opening 12 in the body.

Preferably a scraper is provided for scraping back into the body any of the contents which may have adhered to the inner face of the valance when the vehicle body was tipped. Such scraper is indicated most clearly in Figs. 9, 10 and 13. A beading 38 is affixed to the body panel 13 adjacent the radially extending edge of the opening 12 and has affixed thereto a scraper 39 which may conveniently be of a resilient material such as rubber. As may be more particularly seen from Fig. 12 the edges of the rectangular cut out 11 in the platform 10 may be provided with a sealing strip 40 of material such as rubber.

The platform 10 terminates at its rear end in a step 24 to which a second step 25 is hinged (Figs. 5 and 7), the depths of the steps being such that the step 25 can be folded upwardly and into the vehicle so that when the underside of step 25 is directed upwardly it lies flush with the platform 10 and housed within the body as shown in Fig. 6. The step 25 should be in the position shown in Fig. 6 on tipping of the body. The step 25 is provided with an extension 25a which when the step is in its operative position shown in Fig. 7 extends in a forward direction but which when the step is in the folded position shown in Figs. 6 and 8 serves to extend the platform of the vehicle thereby affording a longer reach for tipping into hoppers and the like.

To effect some reduction in the manual effort required to raise the step 25 and to provide a retaining force for maintaining the step 25 in its upper folded position, a shaft 43 is rotatably mounted in lugs 44 carried by the step 24 and carries lugs 45 for rotation therewith and to which the step 25 is connected. The shaft 43 carries a pinion 46 meshing with a gear 47 rotatable on a stub shaft projecting sidewardly from the step 24, an assisting and retaining torque being applied to the gear 47 by a spring 48 one end of which is connected to a crank arm rotatable with the gear 47.

The present invention may also be applied to a drop side tipping vehicle and such an embodiment will now be described with reference to Figs. 14 and 15. The vehicle body includes a platform 10 pivotally mounted at 16 to the chassis 17, and includes at least one drop side 41 which is removably pivoted to the body by pin hinges 42. The wheel arch 14 includes a flat crown portion 3 and arcuate crown portion 4, an inner side plate 2 and an outer side plate 1. The valance 5 of the wheel arch shown in Figs. 1 to 4 is not required. The rear end of the wheel arch is hinged to the platform 10 by hinge 9 whilst the front edge of the arch rests when in its normal position upon an outrigger 20, a dashpot linkage 19 being included between the wheel arch and the chassis 17 as previously described. Whilst the outer side plate 1 might be arranged to rub against the drop side 41 it is more convenient to provide a clearance space between them. This clearance space is preferably tapered downwardly.

To enable the wheels and tyres to be removed the drop side is provided with a removable segment 43. To seal the wheel arch 14 against the drop side 41 to prevent material from falling therebetween an arcuate sealing strip 44 is secured to the side plate 1 of the wheel arch 14. The strip 44 runs just above the upper margin of the removable segment 43 of the drop side 41.

I claim:

1. A load carrying tipping vehicle having a rearwardly tipping body the floor of which has openings in the region of the rear wheels through which the wheels can project when the body is in its normal position and having wheel arches rearwardly hinged to the body floor and fitting in and closing said openings and relatively to which the body is angularly displaceable on tipping to result in downward retraction of the wheel arches from the body on tipping, each of said wheel arches having a rearward crown portion which when the body is in its normal position inclines upwardly and forwardly relatively to the floor and meets a forward arcuate crown portion which extends downwardly and forwardly close to the forward margin of its opening in the floor, said rearward crown portion lying close to the floor when the body is tipped with the arcuate crown portion remaining close to the forward margin of its opening in the floor, whereby to reduce the obstruction of the wheel arch to the discharge of the contents of the vehicle.

2. A tipping vehicle according to claim 1 in which each wheel arch is of box-like form in that in addition to an inner side panel it is provided with an outer side panel parallel to the inner side panel.

3. A tipping vehicle according to claim 1 in which said rearward crown portion has a surface similar to the upper surface of the floor in the region of said openings so as to lie substantially flush with the floor when the body is tipped.

4. A tipping vehicle according to claim 1 in which the upward inclination of said rearward crown portion when the body is in its normal position is less than the maximum angle through which the body may be tipped, said wheel arch being angularly displaceable upwardly with the body on tipping when the tipping angle exceeds said upward inclination.

5. A tipping vehicle as claimed in claim 4 having lost motion interconnecting means between each wheel arch and the body to enable the body to angularly displace the wheel arch upwardly when the tipping angle of the body exceeds said upward inclination.

6. A tipping vehicle according to claim 4 comprising counterloading means such for example as a dashpot between each wheel arch and the vehicle chassis tending to resist upward angular displacement of the wheel arch with the body.

7. A tipping vehicle according to claim 4 comprising stop means for each wheel arch to prevent upward angular displacement of the wheel arch beyond a position at which its rearward crown portion is substantially flush with the floor of the body at its maximum elevation.

8. A tipping vehicle according to claim 4 comprising a chassis, a body pivoted thereto about a transverse pivotal axis, wheel arches hinged to the body about a transverse hinge axis above said pivotal axis so that downward angular movement of the body relatively to the wheel arches will cause forward movement of the wheel arches relatively to the chassis and detent means on the chassis and wheel arches adapted to be interengaged by said forward movement of the wheel arches relatively to the chassis to lock the wheel arches in their lowermost positions.

9. A load carrying tipping vehicle having a rearwardly tipping body the floor of which has openings in the region of the rear wheels through which the wheels can project when the body is in its normal position and having wheel arches rearwardly hinged to the body floor and fitting in and closing said openings and relatively to which the body is angularly displaceable on tipping to result in downward retraction of the wheel arches from the body, each of said wheel arches having a rearward crown portion which when the body is in its normal position inclines upwardly and forwardly relatively to the floor and meets a forward arcuate crown portion which extends downwardly and forwardly close to the forward margin of its opening in the floor, said rearward crown portion lying substantially flush with the floor when the body is tipped with the forward crown portion remaining close to the forward margin of its opening in the floor.

10. A load carrying tipping vehicle having a rearwardly tipping body the floor of which has openings in the region of the rear wheels through which the wheels can project when the body is in its normal position and having wedge-shaped box-like wheel arches rearwardly hinged to the body floor and fitting in and closing said openings and relatively to which the body is angularly displaceable on tipping to result in downward retraction of the wheel arches from the body on tipping, each of said wheel arches having a rearward substantially flat crown portion which when the body is in its normal position inclines upwardly and forwardly relatively to the floor and meets a forward arcuate crown portion which extends downwardly and forwardly close to the forward margin of its opening in the floor, said rearward crown portion lying substantially flush with the floor when the body is tipped with the forward crown portion remaining close to the forward margin of its opening in the floor.

11. A load carrying tipping vehicle having a rearwardly tipping body the floor of which has openings adjacent the sides thereof in the region of the rear wheels through which the wheels can project when the body is in its normal position and having wedge-shaped wheel arches rearwardly hinged to the body floor and fitting in and closing said openings and relatively to which the body is angularly displaceable on tipping to result in downward retraction of the wheel arches from the body, the sides of the body having upwardly and forwardly inclined wedge-shaped openings adjacent to the openings in the floor, each of said wheel arches having a rearward crown portion which when the body is in its normal position inclines upwardly and forwardly relatively to the floor and meets a forward crown portion which extends downwardly and forwardly close to the forward margin of its opening in the floor, said rearward crown portion lying substantially flush with the floor when the body is tipped with the forward crown portion remaining close to the forward margin of its opening in the floor, the wheel arches each having an upwardly extending valance at the outer side thereof to close the wedge-shaped openings in the sides of the body on retraction of the wheel arch.

References Cited in the file of this patent

UNITED STATES PATENTS

| | | |
|---|---|---|
| 1,878,851 | Holmes | Sept. 20, 1932 |
| 1,996,540 | Fageol et al. | Apr. 2, 1935 |

FOREIGN PATENTS

| | | |
|---|---|---|
| 965,053 | France | Sept. 1, 1950 |